United States Patent
Zhang et al.

(10) Patent No.: US 12,409,810 B2
(45) Date of Patent: Sep. 9, 2025

(54) VEHICLE CONTROL METHOD, VEHICLE-MOUNTED APPARATUS, AND MOBILE TERMINAL

(71) Applicant: Shenzhen Yinwang Intelligent Technologies Co., Ltd., Guangdong (CN)

(72) Inventors: Guicheng Zhang, Nanjing (CN); Xinyao Jin, Nanjing (CN); Linchuan Guo, Nanjing (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 25 days.

(21) Appl. No.: 18/300,181

(22) Filed: Apr. 13, 2023

(65) Prior Publication Data

US 2023/0256937 A1  Aug. 17, 2023

Related U.S. Application Data (63) Continuation of application No. PCT/CN2021/119392, filed on Sep. 18, 2021.

(30) Foreign Application Priority Data

Oct. 15, 2020  (CN) .......................... 202011105682.4

(51) Int. Cl.
*B60R 25/24* (2013.01)
*G07C 9/00* (2020.01)

(52) U.S. Cl.
CPC .......... *B60R 25/24* (2013.01); *G07C 9/00309* (2013.01); *B60R 2325/101* (2013.01);
(Continued)

(58) Field of Classification Search
CPC ............. B60R 25/24; B60R 2325/101; B60R 2325/205; B60R 25/20; G07C 9/00309; G07C 2009/00507; G07C 2209/63
See application file for complete search history.

(56) References Cited

U.S. PATENT DOCUMENTS 10,803,687 B1   10/2020  Khamis et al.
2017/0278326 A1* 9/2017  DeCia ................. G01S 5/02585
(Continued)

FOREIGN PATENT DOCUMENTS

| CN | 105611502 A | 5/2016 |
| CN | 107650862 A | 2/2018 |
| CN | 110481502 A | 11/2019 |

*Primary Examiner* — Quan Zhen Wang
*Assistant Examiner* — Rajsheed O Black-Childress
(74) *Attorney, Agent, or Firm* — WOMBLE BOND DICKINSON (US) LLP (57) ABSTRACT

A vehicle control method is provided, applied to a vehicle-mounted apparatus, including: The vehicle-mounted apparatus establishes a first communication connection to a mobile terminal, predicts a first movement track or a second movement track of the mobile terminal, and performs a first operation when a first condition is met, or performs a second operation when a second condition is met. The first condition includes: the first movement track enters a first region, and the mobile terminal enters a second region; the second condition includes: the second movement track leaves a third region, and the mobile terminal leaves the second region; and the second region includes the first region, and the third region includes the first region.

18 Claims, 5 Drawing Sheets

(52) U.S. Cl.
CPC ............... *B60R 2325/205* (2013.01); *G07C 2009/00507* (2013.01)

(56) References Cited

U.S. PATENT DOCUMENTS

| | | | |
|---|---|---|---|
| 2018/0290627 A1* | 10/2018 | Hariri | B60R 25/245 |
| 2019/0037034 A1* | 1/2019 | Lee | H04L 67/52 |
| 2019/0263356 A1 | 8/2019 | Golsch et al. | |
| 2020/0086829 A1* | 3/2020 | Wall | B60R 25/245 |
| 2021/0026347 A1* | 1/2021 | Nakashima | B62D 15/0285 |

* cited by examiner

VEHICLE CONTROL METHOD, VEHICLE-MOUNTED APPARATUS, AND MOBILE TERMINAL

CROSS-REFERENCE TO RELATED APPLICATIONS

This application is a continuation of International Application No. PCT/CN2021/119392, filed on Sep. 18, 2021, which claims priority to Chinese Patent Application No. 202011105682.4, filed on Oct. 15, 2020. The disclosures of the aforementioned applications are hereby incorporated by reference in their entireties.

TECHNICAL FIELD

This application relates to the vehicle control field, and in particular, to a vehicle control method, a vehicle-mounted apparatus, and a mobile terminal.

BACKGROUND

As automobile technologies continuously evolve, passive keyless entry and auto-lock functions have become standard configurations of many vehicles. A passive keyless entry system is still in an electronization stage, and gradually enters an intellectualization stage in the future. Currently, there are two main solutions for implementing passive keyless entry: a passive entry and passive start (PEPS) solution and a mobile phone Bluetooth key solution.

In the PEPS solution, a working principle of unlocking or starting a vehicle is as follows: When a user carries a vehicle key (the vehicle key needs to have electricity) and moves to the vicinity of the vehicle, and the user presses an unlocking button or a starting button of the vehicle, the vehicle receives an unlocking or ignition signal and sends a corresponding signal to a low-frequency antenna. After receiving the signal, the low-frequency antenna sends a low-frequency triggering signal to the vehicle key. The vehicle key receives the low-frequency triggering signal and sends a high-frequency unlocking signal. A high-frequency receiver receives the high-frequency unlocking signal, and the vehicle is unlocked or ignited. For the PEPS solution, a vehicle user needs to carry a physical key with the vehicle user. Compared with an increasingly popular Bluetooth vehicle key technology, the PEPS solution cannot meet convenience and comfort requirements of the user.

The mobile phone Bluetooth key solution is used for more vehicles in the market. A vehicle model of Tesla model 3 is used as an example. A mobile phone Bluetooth key (a mobile phone app of Tesla) is located by using two Bluetooth antennas on B-pillars. In this case, a mobile phone Bluetooth function needs to be in an on state. An in-vehicle Bluetooth module may determine whether a user has entered a vehicle, to determine whether to allow the user to start the vehicle. Emergence of the mobile phone Bluetooth key greatly improves vehicle use experience. The vehicle user only needs to carry a smartphone, and does not need to additionally carry a conventional vehicle key, so that functions such as passive keyless entry and keyless vehicle start can be implemented, and a vehicle can be conveniently shared with another person remotely through authorization. However, positioning precision of the mobile phone Bluetooth key is not high, and it is difficult to accurately determine whether a location of the Bluetooth key is inside or outside the vehicle. Consequently, the auto-lock function has a security risk, and the user is not very assured of using the function. In addition, the mobile phone Bluetooth key has another security risk, for example, a risk of a relay attack, which also brings trouble to the user.

It can be learned that, a vehicle control method, a vehicle-mounted apparatus, and a mobile terminal are urgently required currently, to improve positioning precision of a vehicle Bluetooth key. When the user carries the key and approaches a vehicle, an auto-unlock function and an auto-lock function can be implemented, to improve vehicle use convenience and comfort of the user.

SUMMARY

Embodiments of this application provide a vehicle control method, a vehicle-mounted apparatus, and a mobile terminal, so that positioning precision of a vehicle Bluetooth key is improved, an intention of a vehicle user is identified, a vehicle automatically executes an operation instruction such as unlocking a vehicle door or locking a vehicle door, use convenience of a passive entry and passive start function of the vehicle is improved, and convenience and comfort experience of using the vehicle by the user is improved.

According to a first aspect, a vehicle control method is provided, applied to a vehicle-mounted apparatus, including:
establishing a first communication connection to a mobile terminal;
predicting a first movement track or a second movement track of the mobile terminal; and
performing a first operation when a first condition is met; or
performing a second operation when a second condition is met, where
the first condition includes: the first movement track enters a first region, and the mobile terminal enters a second region;
the second condition includes: the second movement track leaves a third region, and the mobile terminal leaves the second region; and
the second region includes the first region, and the third region includes the first region.

According to the technical solution in embodiments of this application, the vehicle-mounted apparatus establishes the first communication connection to the mobile terminal, so that positioning precision of a vehicle Bluetooth key is improved, an intention of a user can be identified, an automatic control level of the vehicle is improved, and convenience and comfort experience of using the vehicle by the user is improved.

In one embodiment, the predicting a first movement track or a second movement track of the mobile terminal includes:
obtaining a plurality of location parameters of the mobile terminal, and predicting the first movement track or the second movement track based on the plurality of location parameters.

In one embodiment, the predicting a first movement track of the mobile terminal further includes: when a distance between the mobile terminal and the vehicle-mounted apparatus is less than or equal to a first preset value, obtaining the plurality of location parameters by using the first communication connection.

In one embodiment, the obtaining a second movement track of the mobile terminal includes: when a distance between the mobile terminal and the vehicle-mounted apparatus is greater than or equal to a third preset value, obtaining the plurality of location parameters by using the first communication connection.

In one embodiment, one or more of a light, a sound, or notification information sent to the mobile terminal are used to notify that the first operation or the second operation is performed, is being performed, or is to be performed.

According to a second aspect, embodiments of this application provides a vehicle control method, applied to a mobile terminal, including:
  establishing a first communication connection to a vehicle-mounted apparatus; and
  sending a plurality of pieces of first information to the vehicle-mounted apparatus, where
    the plurality of pieces of first information are used to indicate a location parameter of the mobile terminal.

According to the technical solution in embodiments of this application, the vehicle-mounted apparatus establishes the first communication connection to the mobile terminal, so that positioning precision of a vehicle Bluetooth key is improved, an intention of a user can be identified based on a movement track of the mobile terminal, the vehicle automatically executes an operation instruction such as unlocking a vehicle door, and convenience of using the vehicle is improved.

In one embodiment, the mobile terminal receives notification information, and the notification information is used to notify that the first operation or the second operation is performed, is being performed, or is to be performed.

In one embodiment, the vehicle-mounted apparatus and the mobile terminal establish a second communication connection, and perform validity authentication on the vehicle-mounted apparatus and the mobile terminal by using the second communication connection.

In one embodiment, the first communication connection includes one or more of ultra-wideband (UWB) communication, Bluetooth communication, and Wi-Fi communication.

In one embodiment, the second communication connection includes one or more of Bluetooth communication, ZigBee communication, Wi-Fi communication, and UWB communication.

According to a third aspect, embodiments of this application provides a vehicle-mounted apparatus for vehicle control, including:
  a first communication module, configured to establish a first communication connection to a mobile terminal;
  an analysis module, configured to predict a first movement track or a second movement track of the mobile terminal; and
  an execution module, configured to: perform a first operation when a first condition is met; or perform a second operation when a second condition is met, where
  the first condition includes: the first movement track enters a first region, and the mobile terminal enters a second region;
  the second condition includes: the second movement track leaves a third region, and the mobile terminal leaves the second region; and
  the second region includes the first region, and the third region includes the first region.

According to the technical solution in embodiments of this application, the vehicle-mounted apparatus establishes the first communication connection to the mobile terminal, so that positioning precision of a vehicle Bluetooth key is improved, an intention of a user can be identified based on a movement track of the mobile terminal, a function such as automatic unlocking, locking, or starting of the vehicle is implemented, and convenience and comfort experience of using the vehicle by the user is improved.

In one embodiment, the predicting a first movement track or a second movement track of the mobile terminal includes: obtaining a plurality of location parameters of the mobile terminal, and predicting the first movement track or the second movement track based on the plurality of location parameters.

In one embodiment, the predicting a first movement track of the mobile terminal further includes: when a distance between the mobile terminal and the vehicle-mounted apparatus is less than or equal to a first preset value, obtaining the plurality of location parameters by using the first communication connection.

In one embodiment, the obtaining a second movement track of the mobile terminal includes: when a distance between the mobile terminal and the vehicle-mounted apparatus is greater than or equal to a third preset value, obtaining the plurality of location parameters by using the first communication connection.

In one embodiment, the vehicle-mounted apparatus further includes a third communication module. The third communication module is configured to: establish a second communication connection to the mobile terminal, and perform validity authentication on the vehicle-mounted apparatus and the mobile terminal by using the second communication connection.

According to a fourth aspect, embodiments of this application provides a mobile terminal for vehicle control, including:
  a second communication module, configured to establish a first communication connection to a vehicle-mounted apparatus; and
  a second sending module, configured to send a plurality of pieces of first information to the vehicle-mounted apparatus, where
  the plurality of pieces of first information are used to indicate a location parameter of the mobile terminal.

In one embodiment, the mobile terminal further includes a fourth communication module. The fourth communication module is configured to: establish a second communication connection to the vehicle-mounted apparatus, and perform validity authentication on the vehicle-mounted apparatus and the mobile terminal by using the second communication connection.

In one embodiment, the mobile terminal receives notification information, and the notification information is used to notify that the first operation or the second operation is performed, is being performed, or is to be performed.

In one embodiment, the first communication module or the second communication module includes one or more of an ultra-wideband UWB communication module, a Bluetooth communication module, and a Wi-Fi communication module.

In one embodiment, the third communication module or the fourth communication module includes one or more of a Bluetooth communication module, a ZigBee communication module, and a Wi-Fi communication module.

In one embodiment, the first operation includes one or more of unlocking a vehicle door, starting an engine, unlocking a trunk, powering on an entire vehicle, starting an air conditioner, and opening a vehicle window.

In one embodiment, the second operation includes one or more of turning off the engine, powering off the entire vehicle, locking the vehicle door, closing the vehicle window, and turning off the air conditioner.

According to a fifth aspect, embodiments of this application provides a vehicle-mounted device, including a receiver, a transmitter, and a processor. Under control of the processor, the receiver and the transmitter are configured to perform the method in the first aspect or the possible implementations of embodiments of this application.

According to a sixth aspect, embodiments of this application provides a mobile terminal, including a receiver, a transmitter, and a processor. Under control of the processor, the receiver and the transmitter are configured to perform the method in the second aspect or the possible implementations of embodiments of this application.

According to a seventh aspect, embodiments of this application provides a vehicle. The vehicle includes the vehicle-mounted apparatus or the vehicle-mounted device in the third aspect, the fifth aspect, and the possible implementations of embodiments of this application.

According to an eighth aspect, embodiments of this application provides a computer-readable storage medium. The computer-readable storage medium stores a computer program. When the computer program is executed, the method in the first aspect and the second aspect or the possible implementations of embodiments of this application is implemented.

According to a ninth aspect, embodiments of this application provides an electronic device, including one or more processors. The one or more processors are coupled to a memory, the memory stores a computer program, and the processor is configured to execute the computer program stored in the memory, to implement the method in the first aspect and the second aspect or the possible implementations of embodiments of this application.

According to the technical solutions in embodiments of this application, the vehicle-mounted apparatus establishes the first communication connection to the mobile terminal, so that positioning precision of a vehicle Bluetooth key is improved, an intention of a user can be identified based on a movement track of the mobile terminal, a function such as automatic unlocking, locking, or starting of the vehicle is implemented, and use convenience of the vehicle is improved.

DESCRIPTION OF EMBODIMENTS

The following further describes this application in detail with reference to accompanying drawings and embodiments. It should be understood that the specific implementations described herein are merely used to explain this application, but are not intended to limit this application.

Figure 1:
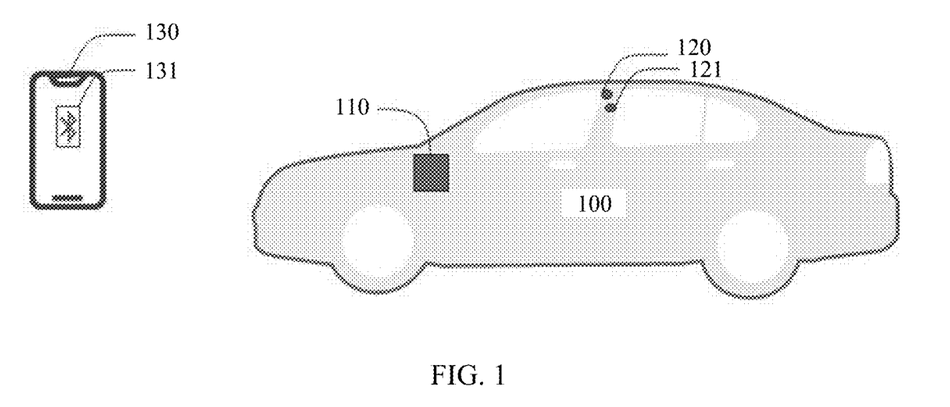
FIG. 1 is a schematic diagram of a vehicle control system according to an embodiment of this application.

FIG. 1 is a schematic diagram of a vehicle control system according to an embodiment of this application. The system includes a vehicle 100 and a mobile terminal 130. It can be understood that the mobile terminal 130 may be user equipment (UE), a terminal, an access terminal, a terminal unit, a terminal station, a mobile station (MS), a remote station, a remote terminal, a mobile terminal, a wireless communication device, a terminal agent, a terminal device, or the like. The mobile terminal 130 may alternatively be a communication chip having a communication module, or may be a vehicle having a communication function, a vehicle-mounted device (for example, a vehicle-mounted communication apparatus or a vehicle-mounted communication chip), or the like. The mobile terminal 130 may have a wireless transceiver function.

The mobile terminal 130 may include any one or more of a smartphone, a personal computer, a tablet computer, and a personal digital assistant (PDA). A type of the mobile terminal 130 is not limited in this embodiment of this application.

Specifically, the mobile terminal 130 includes a Bluetooth communication module 131, and the vehicle 100 includes an in-vehicle Bluetooth communication module 110. For example, a vehicle-mounted apparatus on the vehicle 100 may establish a Bluetooth connection to the mobile terminal 130 by using the in-vehicle Bluetooth communication module 110, and exchange information by using the Bluetooth connection, for example, perform validity authentication on the mobile terminal 130 and the vehicle 100 by using the Bluetooth connection. Further, the in-vehicle Bluetooth communication module 110 may be an independent module or a vehicle-mounted component and deployed in the vehicle 100. Alternatively, the in-vehicle Bluetooth communication module 110 may be integrated into another vehicle-mounted device and used as a component of the vehicle-mounted device. An arrangement manner of the in-vehicle Bluetooth communication module 110 is not limited in this embodiment of this application.

In an example of the specific implementation, the vehicle 100 further includes vehicle-mounted Bluetooth antennas 120 and 121. The vehicle-mounted Bluetooth antennas 120 and 121 may be configured to: send a Bluetooth signal to the mobile terminal 130, and receive a signal from the mobile terminal 130. For example, the vehicle-mounted Bluetooth antennas 120 and 121 may be respectively disposed near a left B-pillar and a right B-pillar of the vehicle 100. It can be understood that the vehicle 100 may include a plurality of Bluetooth antennas, and the plurality of Bluetooth antennas may be disposed at a plurality of locations other than the B-pillar in the vehicle based on a requirement. This is not limited in this embodiment of this application.

In another example of the specific implementation, the vehicle-mounted Bluetooth antennas 120 and 121 may determine a location of the mobile terminal 130 by using the Bluetooth connection to the mobile terminal 130. For example, the vehicle-mounted Bluetooth antennas 120 and 121 are used to determine whether a user is inside or outside the vehicle, to execute a corresponding vehicle operation instruction, for example, a vehicle door unlocking instruction.

Figure 2:
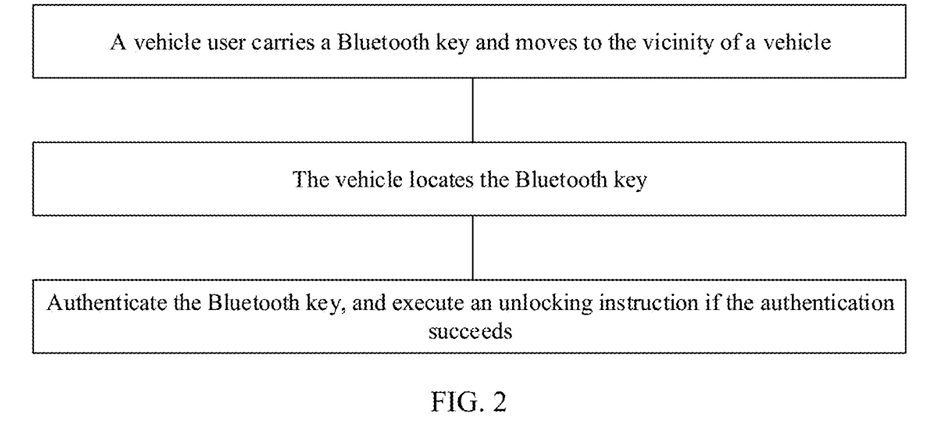
FIG. 2 is a schematic flowchart of a vehicle control method according to an embodiment of this application.

FIG. 2 is a schematic flowchart of a vehicle control method according to an embodiment of this application. A procedure in which a vehicle-mounted device and a mobile terminal unlock a vehicle door through Bluetooth communication is used as an example to describe the vehicle control method below. It can be understood that vehicle control further includes operations such as powering on and powering off an entire vehicle, starting and turning off an engine, starting and turning off an air conditioner, and unlocking and locking the vehicle door. This is not limited in this embodiment of this application.

Operation 210: A vehicle user carries a Bluetooth key and moves to the vicinity of the vehicle.

Specifically, when a Bluetooth communication module of the mobile terminal has completed pairing with a Bluetooth communication module of the vehicle-mounted device, the mobile terminal establishes a Bluetooth connection to the vehicle-mounted device in a process in which the vehicle user carries the mobile terminal (the Bluetooth key) and approaches the vehicle. Specifically, the vehicle user opens an application app associated with the vehicle in the mobile terminal. When the mobile terminal moves towards the vehicle and there is a specific distance, or signal strength reaches a predetermined value, the vehicle-mounted device establishes the Bluetooth connection to the mobile terminal. In one embodiment, the application app associated with the vehicle may keep running in the background of the mobile terminal. In this case, when approaching the vehicle, the user does not need to perform an operation of taking out the mobile terminal and opening the app.

Operation 220: The vehicle locates the Bluetooth key.

Specifically, the Bluetooth key is located by deploying a Bluetooth antenna on the vehicle, to determine a distance between the vehicle and the Bluetooth key. For example, the vehicle determines a location of the Bluetooth key by using two Bluetooth antennas disposed on B-pillars, and determines, based on the distance between the Bluetooth key and the vehicle, a to-be-executed operation instruction, for example, a vehicle door unlocking instruction. Further, an in-vehicle Bluetooth module may determine whether the Bluetooth key is inside or outside the vehicle, to determine whether to allow the user to start the vehicle. It can be understood that, when an app corresponding to the vehicle is installed in the mobile terminal, and has completed association of the app and the vehicle, the mobile terminal has a same meaning as the Bluetooth key and a vehicle Bluetooth key in this application.

Operation 230: Authenticate the Bluetooth key, and execute the operation instruction if authentication succeeds.

Specifically, when the distance between the Bluetooth key and the vehicle or signal strength of the Bluetooth connection reaches a predetermined value or a predetermined value range, validity authentication is performed on the Bluetooth key. When validity authentication succeeds, the corresponding operation instruction is executed.

In an example of the specific implementation, when the Bluetooth key is within a range of 1 meter away from the vehicle, and the vehicle user has completed an application for the vehicle Bluetooth key by using the app, the vehicle door unlocking instruction is sent by using the mobile terminal. After authentication performed by the in-vehicle Bluetooth module on the Bluetooth key succeeds, the vehicle door unlocking instruction is sent to a body control module (BCM) of the vehicle by using an in-vehicle controller area network (CAN) bus, and an operation of unlocking a vehicle door is performed.

In another example of the specific implementation, when it is determined that the Bluetooth key is located inside the vehicle, an instruction of powering on the entire vehicle may be sent to a vehicle control unit (VCU) by using the CAN bus of the vehicle, and an operation of starting the vehicle is performed.

According to the foregoing technical solution, the vehicle user can implement a control operation such as unlocking, locking, or starting the vehicle without a need to carry a physical key. However, Bluetooth positioning precision is not very high, and the positioning precision is still at a meter level. Consequently, whether the Bluetooth key is inside or outside the vehicle is determined inaccurately, and a wrong operation is easily performed.

Figure 3:
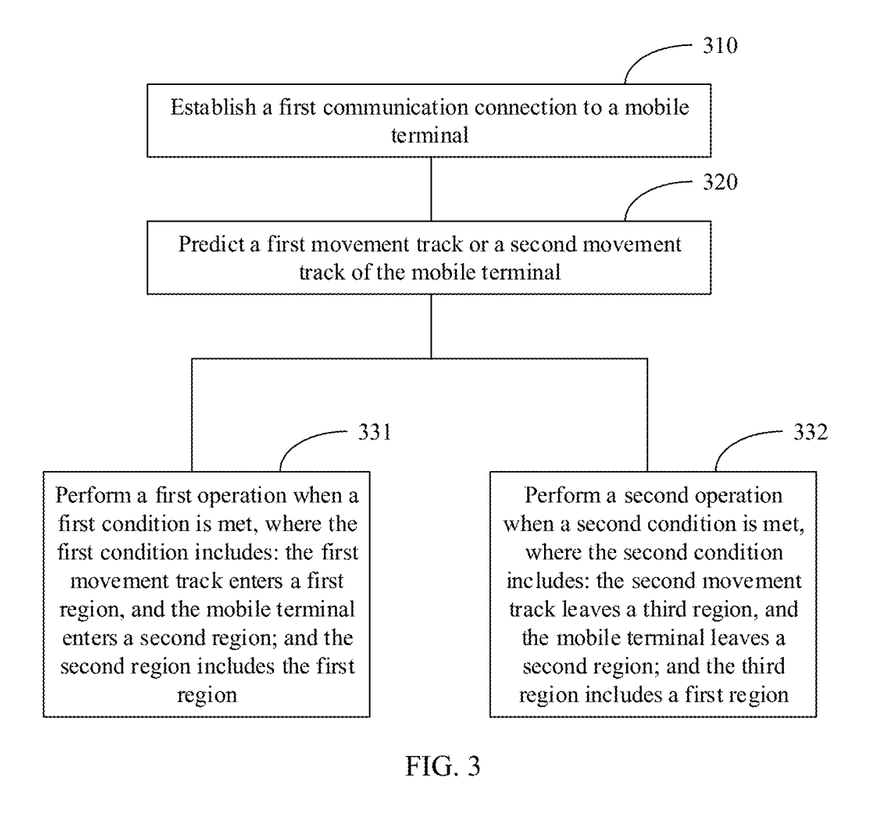
FIG. 3 is a schematic flowchart of another vehicle control method according to an embodiment of this application.

FIG. 3 is a schematic flowchart of a vehicle control method according to an embodiment of this application. The method is applied to a vehicle-mounted apparatus. In the following specific implementations of this application, unlocking a vehicle door is mainly used as an example to describe specific operations of the vehicle control method. It can be understood that the vehicle-mounted apparatus in this embodiment of this application may be any one or more of a vehicle-mounted communication box T-Box (Telematics Box), a mobile data center (MDC), a vehicle integrated unit (VIU), and a cockpit domain controller (CDC). This is not limited in this embodiment of this application.

Operation 310: Establish a first communication connection to a mobile terminal.

Specifically, both the mobile terminal and a vehicle may have a function of performing first communication. In a process in which a user carries the mobile terminal and approaches the vehicle, the mobile terminal and the vehicle-mounted apparatus establish the first communication connection. For example, the first communication may include any one or more of ultra-wideband UWB communication, Bluetoothcommunication, ZigBee communication, infrared communication, Wi-Fi communication, or near field communication (NFC). This is not limited in this embodiment of this application. In a specific implementation of this application, the vehicle control method is specifically described by using UWB communication as an example. It can be understood that vehicle control may include one or more of unlocking and locking the vehicle door, opening and closing a trunk, starting and turning off an air conditioner, opening and closing a vehicle window, powering on and powering off the entire vehicle, and starting and turning off an engine. A specific type of vehicle control is not limited in this embodiment of this application.

In an example of the specific implementation, when a vehicle user carries the mobile terminal and approaches the vehicle, a UWB communication module of the vehicle and a UWB communication module of the mobile terminal establish a UWB communication connection. It can be understood that the UWB communication module of the vehicle may be an independent vehicle-mounted component, or may be integrated into another vehicle-mounted apparatus as a component. An arrangement manner of the UWB communication module is not limited in this embodiment of this application. Further, a plurality of UWB beacons are disposed on the vehicle, to obtain a location parameter of the mobile terminal. For example, four UWB beacons are disposed on the vehicle, and are respectively disposed near a center console of the vehicle, near a rear windshield, and near left and right B-pillars of the vehicle, so that the mobile terminal can be precisely located. It can be understood that a quantity of UWB beacons and a deployment manner may be adjusted. This is not limited in this application.

In another example of the specific implementation, the mobile terminal may further establish a second communication connection to a vehicle-mounted apparatus, and authenticate validity of the vehicle-mounted apparatus and the mobile terminal by using the second communication connection. In an example of the specific implementation, the mobile terminal establishes a Bluetooth connection to the vehicle-mounted apparatus, and performs validity authentication by using the Bluetooth connection. It can be understood that the second communication connection may include any one or more of Bluetooth communication, ZigBee communication, infrared communication, Wi-Fi communication, or near field communication NFC. A type of the second communication connection is not limited in this embodiment of this application.

Operation 320: Predict a first movement track or a second movement track of the mobile terminal.

Specifically, a plurality of location parameters of the mobile terminal are obtained, and the first movement track or the second movement track is predicted based on the plurality of location parameters. For example, the first movement track may indicate a movement process in which the user carries a Bluetooth key and approaches the vehicle, and the second movement track may indicate a movement process in which the Bluetooth key leaves the vehicle.

In an example of the specific implementation, the vehicle user carries the mobile terminal and moves towards the vehicle, and the UWB communication connection is established. When a distance between the mobile terminal and the vehicle-mounted apparatus is less than a first preset value, the plurality of location parameters of the mobile terminal are obtained by using the UWB communication connection, and the first movement track is predicted based on the plurality of location parameters. In an implementation, the location parameter of the mobile terminal may start to be obtained when the distance between the mobile terminal and the vehicle-mounted device is equal to the first preset value.

Further, the first preset value may be preset based on factors such as a type of the first communication connection and a vehicle parameter before the vehicle is delivered from a factory, or may be set by the user based on a vehicle use habit, a vehicle use environment, and a user preference. For example, the user may modify the first preset value in a mobile phone app associated with the vehicle, or may modify the first preset value in a user operation interface inside the vehicle. A manner of setting the first preset value is not limited in this application.

Figure 4:
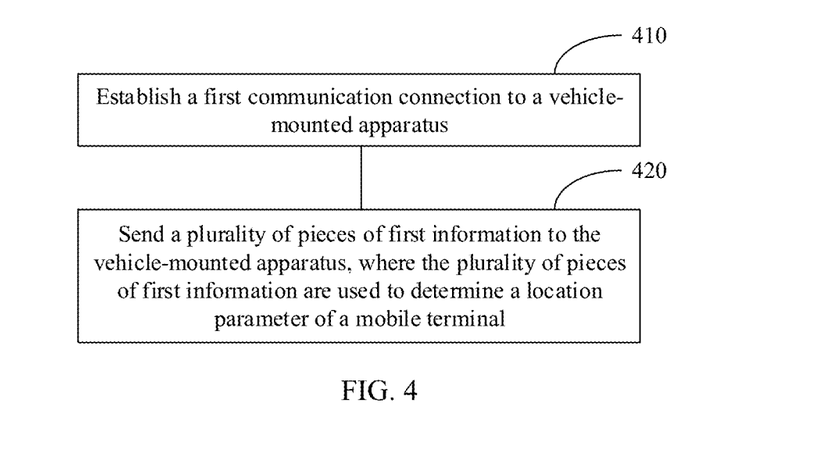
FIG. 4 is a schematic flowchart of another vehicle control method according to an embodiment of this application.

For an implementation of predicting the first movement track by obtaining the plurality of location parameters of the mobile terminal, refer to specific content in an embodiment corresponding to FIG. 4 in this application. Details are not described herein again.

In another example of the specific implementation, when the vehicle user carries the mobile terminal and moves away from the vehicle, and the distance between the mobile terminal and the vehicle-mounted apparatus is greater than a third preset value, the plurality of location parameters of the mobile terminal are obtained by using the UWB communication connection, and the second movement track is predicted based on the plurality of location parameters. In an implementation, the location parameter of the mobile terminal may start to be obtained when the distance between the mobile terminal and the vehicle-mounted device is equal to the third preset value.

Further, similar to the manner of setting the first preset value, the third preset value may be preset before the vehicle is delivered from a factory, or may be set by the user based on the vehicle use habit, the vehicle use environment, and a vehicle use requirement. For specific content, refer to the foregoing descriptions. Details are not described herein again.

In another example of the specific implementation, the vehicle-mounted device may further establish a Bluetooth communication connection to the mobile terminal, and determine the distance between the mobile terminal and the vehicle-mounted apparatus by using the Bluetooth connection. It can be understood that, in this embodiment of this application, when the mobile terminal is associated with the vehicle, for example, when the mobile terminal is paired with the vehicle and has applied for the Bluetooth key, the Bluetooth key has a same meaning as the mobile terminal.

Further, in terms of positioning precision, the Bluetooth connection has lower positioning precision than the UWB connection, and whether the distance between the mobile terminal and the vehicle-mounted apparatus reaches the first preset value may be determined by using the Bluetooth connection. In one embodiment, when the distance between the mobile terminal and the vehicle-mounted apparatus is less than or equal to the first preset value, the UWB connection is activated, and the plurality of location parameters of the mobile terminal are obtained by using the UWB connection. For example, the second communication connection may be a Bluetooth low energy connection (BLE). According to the technical solution in this embodiment of this application, the first preset value may be determined by using the Bluetooth connection, and the UWB connection does not need to keep a normally on state, so that system power consumption can be reduced.

Operation 331: Perform a first operation when a first condition is met, where the first condition includes: the first movement track enters a first region, and the mobile terminal enters a second region; and the second region includes the first region.

Specifically, the first region may include the vehicle, and the second region includes the first region; or the first region includes the vehicle-mounted apparatus, and the second region includes the first region.

In an example of the specific implementation, when the first movement track predicted based on the plurality of location parameters of the mobile terminal enters the first region, and the mobile terminal enters the second region, a vehicle door unlocking instruction may be sent to an in-vehicle control unit by using an in-vehicle communication network, and the first operation is performed to unlock the vehicle door. For example, the in-vehicle communication network may include one or more of a controller area network CAN bus, a local interconnect network (LIN) bus, a media oriented system transport (MOST) bus, a FlexRay bus, and Ethernet. The in-vehicle control unit may include one or more of a BCM, a VCU, a battery management system (BMS), a motor controller (MCU), and a passive entry/passive start system (PEPS). It can be understood that the first operation may further include one or more of powering on the entire vehicle, starting the air conditioner, starting the engine, unlocking the trunk, and opening the vehicle window. The first operation and a specific type of the in-vehicle control unit are not limited in this embodiment of this application.

Operation 332: Perform a second operation when a second condition is met, where the second condition includes: the second movement track leaves a third region, and the mobile terminal leaves a second region; and the third region includes a first region.

Specifically, the plurality of location parameters of the mobile terminal are obtained by using the UWB, and the second movement track of the mobile terminal is predicted. Further, when the second movement track leaves the third region and the mobile terminal leaves the second region, the second operation may be performed by using the vehicle-mounted apparatus. For example, the third region includes the second region.

In an example of the specific implementation, when the second movement track leaves the third region and the mobile terminal leaves the second region, a vehicle door unlocking instruction may be sent to an in-vehicle control unit by using an in-vehicle communication network, and the second operation is performed. It can be understood that the second operation may include one or more of turning off the engine, powering off the entire vehicle, turning off the air conditioner, and closing the vehicle window. This is not limited in this embodiment of this application.

In another example of the specific implementation, an execution status of the first operation or the second operation is prompted. For example, the execution status of the first operation or the second operation may be prompted by using one or more of a vehicle light, a vehicle sound, or notification information sent to the mobile terminal. For example, the execution status of the first operation or the second operation may be prompted by blinking a turn light or honking a car horn. It can be understood that the execution status of the first operation or the second operation may include at least one of a state in which the first operation or the second operation is executed, a state in which the first operation or the second operation is being executed, or a state in which the first operation or the second operation is to be executed. This is not limited in this embodiment of this application.

It can be understood that the performing a first operation or the performing a second operation in this embodiment of this application includes sending a first operation instruction or a second operation instruction, or performing a first operation instruction or a second operation instruction. For example, an operation instruction of powering on/powering off the entire vehicle is sent by using the VCU, or a vehicle door unlocking/unlocking operation is performed by using the BCM.

FIG. 4 is a schematic flowchart of a vehicle control method according to an embodiment of this application. The method is applied to a mobile terminal. In the following specific implementations of this application, unlocking a vehicle door is mainly used as an example to describe specific operations of the vehicle control method.

Operation 410: Establish a first communication connection to a vehicle-mounted apparatus.

Specifically, in a process in which a user carries the mobile terminal and approaches a vehicle, the mobile terminal establishes the first communication connection to the vehicle-mounted device. For ease and brevity of descriptions, for descriptions of operation 410, refer to corresponding content in the embodiment shown in FIG. 3 in this application. Details are not described herein again.

Operation 420: Send a plurality of pieces of first information to the vehicle-mounted apparatus, where the plurality of pieces of first information are used to indicate a location parameter of the mobile terminal.

Specifically, the mobile terminal establishes the first communication connection to the vehicle-mounted apparatus, and sends the plurality of pieces of first information to the vehicle-mounted apparatus, to indicate the location parameter of the mobile terminal. For example, the first communication connection may be an ultra-wideband UWB communication connection. For ease and brevity of descriptions, for descriptions of operation 420, refer to corresponding content in the embodiment shown in FIG. 3 in this application. Details are not described herein again.

Figure 5:
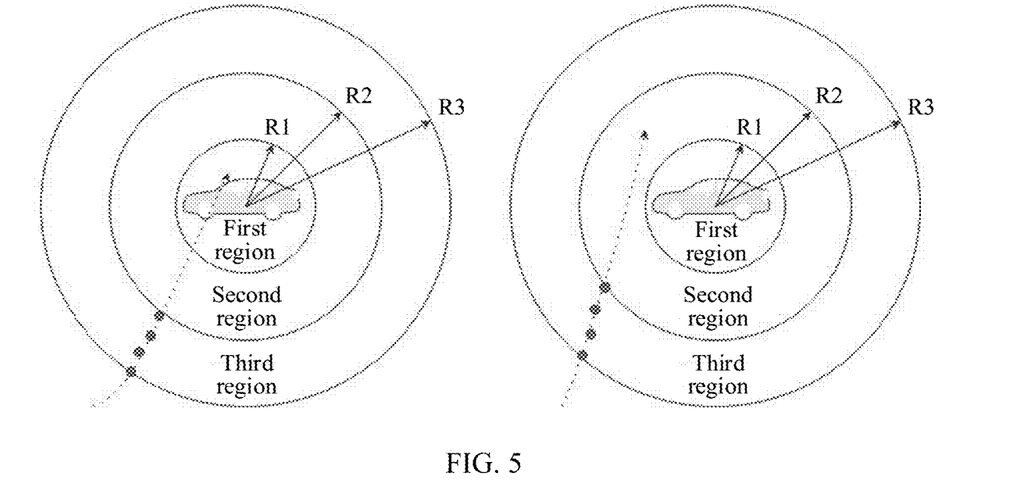
FIG. 5 is a schematic flowchart of a movement track prediction method according to an embodiment of this application.

FIG. 5 is a schematic flowchart of a movement track prediction method according to an embodiment of this application. The method is used to predict a first movement track or a second movement track of a mobile terminal. In this embodiment of this application, a method for predicting the first movement track is described based on a concentric circle model. It can be understood that the first movement track or the second movement track may alternatively be predicted by using another model, for example, a swimlane model. This is not limited in this application.

Specifically, when a vehicle user carries the mobile terminal and moves, a movement track of the user may be considered to be equivalent to a movement track of the mobile terminal, and the first movement track or the second movement track each may indicate the movement track of the user and the movement track of the mobile terminal. A model including three concentric circles is established by using a vehicle or a vehicle-mounted device as a circle center, and separately corresponds to a first region, a second region, and a third region from inside to outside, and radii of the three concentric circles are R1, R2, and R3. Further, R1, R2, and R3 respectively indicate a third preset value, a second preset value, and a first preset value. It can be understood that the concentric circle model may alternatively be constructed in another manner. This is not limited in this application.

In another example of the specific implementation, a coordinate system is established by using a circle center of the concentric circle as an origin, and azimuths β1, β2, β3, . . . , and βi relative to a previous coordinate point are sequentially calculated by using a last obtained coordinate point as a reference. For example, when a distance between the mobile terminal and a vehicle-mounted apparatus is less than a first preset value R3, a plurality of coordinate points of the mobile terminal are obtained by using a UWB communication connection. A maximum of N pieces of data are used to calculate the azimuth, where N is a positive integer greater than or equal to 1. If an included angle between βi and β1 is greater than a predetermined value, the coordinate point is discarded. It can be understood that the coordinate point in this embodiment of this application has a same meaning as a location parameter of the mobile terminal or the user. Based on a vector β calculated in the foregoing operations, a change rate of βi is calculated. In other words, a derivative f'(M) of a curve of a vector M is calculated. Further, an intersection point of the function f'(M) and a coordinate region of the first region is calculated based on a derivative function f'(m). For example, if there is a calculated value, and the function f'(M) intersects with the coordinate region of the first region, it is considered that the first track enters the first region; or if a track obtained through calculation based on the function f'(M) does not intersect with the coordinate region of the first region, it is considered that the first track does not enter the first region. It can be understood that the second track may be predicted in a method similar to the method in the foregoing content. Details are not described herein again.

Figure 6:
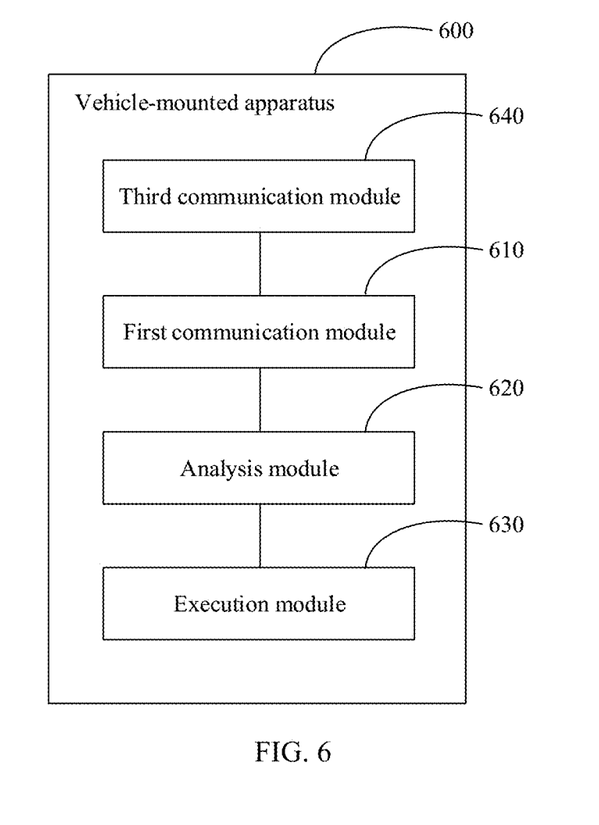
FIG. 6 is a schematic diagram of a structure of a vehicle-mounted apparatus for vehicle control according to an embodiment of this application.

FIG. 6 is a schematic diagram of a structure of a vehicle-mounted apparatus for vehicle control according to an embodiment of this application. A vehicle-mounted apparatus 600 includes a first communication module 610, an analysis module 620, an execution module 630, and a third communication module 640, configured to perform the vehicle control method provided in the embodiment shown in FIG. 3 in this application.

Figure 7:
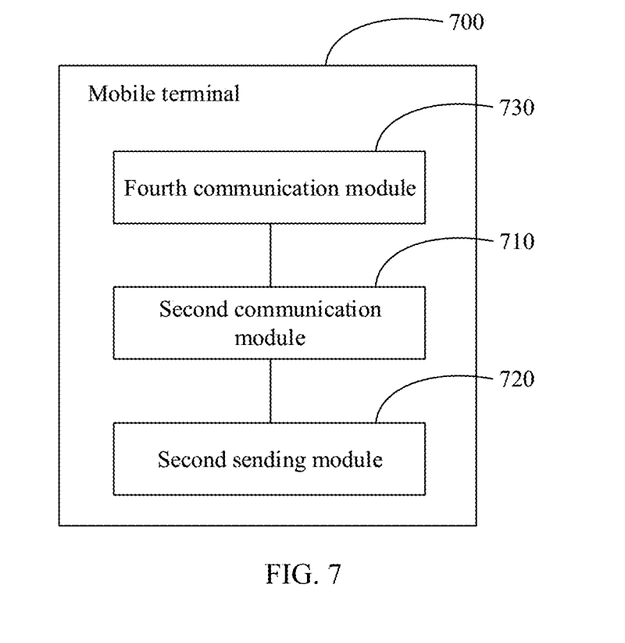
FIG. 7 is a schematic diagram of a structure of a mobile terminal for vehicle control according to an embodiment of this application.

The first communication module 610 is configured to establish a first communication connection to a mobile terminal (for example, a mobile terminal 700 in FIG. 7).

The analysis module 620 is configured to predict a first movement track or a second movement track of the mobile terminal 700.

The execution module 630 is configured to: perform a first operation when a first condition is met; or perform a second operation when a second condition is met.

The third communication module 640 is configured to: establish a second communication connection to the mobile terminal 700, and perform validity authentication on the vehicle-mounted apparatus and the mobile terminal by using the second communication connection.

For ease and brevity of descriptions, for specific descriptions in this embodiment, refer to corresponding content in the embodiment shown in FIG. 3 in this application. Details are not described herein again.

FIG. 7 is a schematic diagram of a structure of a mobile terminal for vehicle control according to an embodiment of this application. The mobile terminal 700 includes a second communication module 710, a second sending module 720, and a fourth communication module 730, and is configured to perform the vehicle control method provided in the embodiment shown in FIG. 4 in this application.

The second communication module 710 is configured to establish a first communication connection to a vehicle-mounted apparatus (for example, the vehicle-mounted apparatus 600 in FIG. 6).

The second sending module 720 is configured to send a plurality of pieces of first information to the vehicle-mounted apparatus 600.

Specifically, the first information is used to determine a location parameter of the mobile terminal 700.

The fourth communication module 730 is configured to: establish a second communication connection to the vehicle-mounted apparatus 600, and perform validity authentication by using the second communication connection.

Specifically, validity authentication is performed on the vehicle-mounted apparatus 600 and the mobile terminal 700 by using the second communication connection, for example, a Bluetooth connection.

For ease and brevity of descriptions, for specific descriptions in this embodiment, refer to corresponding content in the embodiment shown in FIG. 3 in this application. Details are not described herein again.

Figure 8:
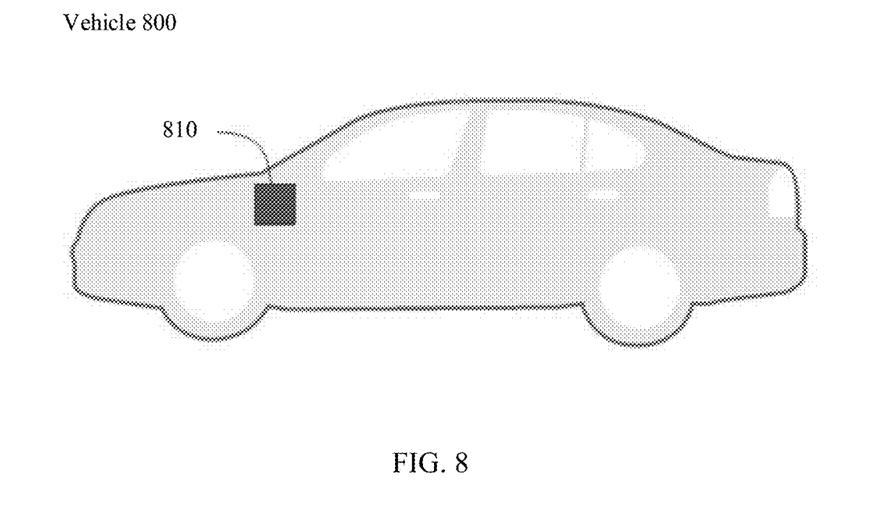
FIG. 8 is a schematic diagram of a structure of a vehicle according to an embodiment of this application.

FIG. 8 is a schematic diagram of a structure of a vehicle according to an embodiment of this application. A vehicle 800 includes a vehicle-mounted device 810. It can be understood that the vehicle-mounted device 810 corresponds to a vehicle-mounted apparatus 600 provided in the embodiment shown in FIG. 6 in this application.

An embodiment of this application provides a computer-readable storage medium. The computer-readable storage medium stores a computer program. When the computer program is executed by a processor, the method provided in the embodiment shown in FIG. 3 or FIG. 4 in this application is implemented.

Figure 9:
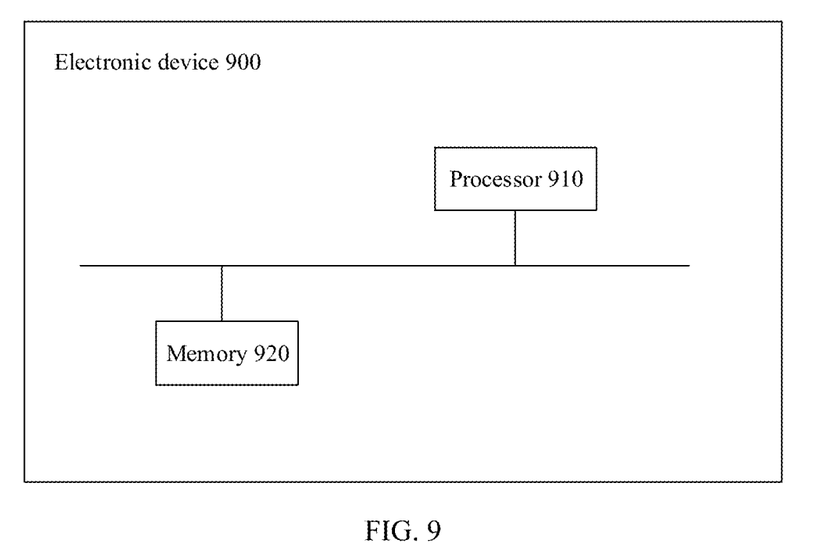
FIG. 9 is a schematic diagram of a structure of an electronic device according to an embodiment of this application.

FIG. 9 is a schematic diagram of a structure of an electronic device according to an embodiment of this application. The electronic device includes a processor 910.

The processor 910 is configured to execute a computer program stored in a memory 920, to implement the vehicle control method provided in the embodiment shown in FIG. 3 or FIG. 4 in this application. In one embodiment, the processor 910 is coupled to the memory 920.

The processor 910 may be one or more processors. This is not limited in this embodiment of this application.

In one embodiment, the electronic device 900 may further include the memory 920, and the memory 920 stores the computer program.

An embodiment of this application provides a vehicle-mounted device, including a receiver, a transmitter, and a processor. Under control of the processor, the receiver and the transmitter are configured to perform the method provided in the embodiment shown in FIG. 3 or FIG. 4 in this application.

An embodiment of this application provides a mobile terminal, including a receiver, a transmitter, and a processor. Under control of the processor, the receiver and the transmitter are configured to perform the method provided in the embodiment shown in FIG. 4 in this application.

Terms used in the specific implementations of embodiments of this application are merely used to explain the specific implementations of this application, but are not intended to limit embodiments of this application.

It should be noted that, to clearly describe the technical solutions in embodiments of this application, words such as "first" and "second" are used in embodiments of this application to distinguish between same items or similar items with basically a same function and purpose. For example, the first operation and the second operation are merely used to distinguish between different operations. Unless otherwise specified and limited, a sequence of the first operation and the second operation is not limited, and cannot be understood as an indication or an implication. A person skilled in the art may understand that the terms such as "first" and "second" do not limit a quantity or an execution sequence.

"Vehicle" or another similar term in embodiments of this application includes a general motor vehicle, for example, includes a car, an SUV, an MPV, a bus, a truck, and another cargo or passenger vehicle, includes water vehicles including various ships and boats, and an aircraft, and includes a hybrid vehicle, an electric vehicle, a fuel vehicle, a plug-in hybrid vehicle, a fuel cell vehicle, and another alternative fuel vehicle. The hybrid vehicle is a vehicle having two or more power sources. The electric vehicle includes a pure electric vehicle, a programmable electric vehicle, and the like. This is not specifically limited in this application.

A person skilled in the art can appreciate that functions described with reference to various illustrative logical blocks, modules, and algorithm operations disclosed and described in this specification may be implemented by hardware, software, firmware, or any combination thereof. If the functions are implemented by the software, the functions described with reference to the various illustrative logical blocks, modules, and operations may be stored or transmitted in a computer-readable medium as one or more instructions or code and executed by a hardware-based processing unit. The computer-readable medium may include a computer-readable storage medium, the computer-readable storage medium corresponds to a tangible medium, for example, a data storage medium, or a communication medium that includes any medium that helps transfer a computer program from one place to another (for example, based on a communication protocol). In this manner, the computer-readable medium generally may correspond to (1) a non-transitory tangible computer-readable storage medium or (2) a communication medium such as a signal or carrier. The data storage medium may be any usable medium that can be accessed by one or more computers or one or more processors to retrieve instructions, code, and/or data structures for implementing the technologies described in this application. A computer program product may include the computer-readable medium.

By way of example but not limitation, such a computer-readable storage medium may include a random access memory (RAM), a read-only memory (ROM), an electrically erasable programmable read-only memory (EEPROM), a compact disk read only memory (CD-ROM), another optical disc storage apparatus, a magnetic disk storage apparatus, another magnetic storage apparatus, a flash memory, or any other medium that may be used to store program code in a form of an instruction or a data structure and that can be accessed by a computer. In addition, any connection is properly referred to as a computer-readable medium. For example, if an instruction is transmitted from a website, a server, or another remote source through a coaxial cable, an optical fiber, a twisted pair, a digital subscriber line (DSL), or a wireless technology, for example, an infrared technology, a radio technology, or a microwave technology, the coaxial cable, the optical fiber, the twisted pair, the DSL, or the wireless technology, for example, the infrared technology, the radio technology, or the microwave technology is included in a definition of the medium. However, it should be understood that the computer-readable storage medium and the data storage medium do not include a connection, a carrier, a signal, or another transitory medium, but actually, are non-transitory tangible storage media. Disks and discs used in this specification include a compact disc (CD), a laser disc, an optical disc, a digital versatile disc (DVD), and a Blu-ray disc. The disk usually reproduces data magnetically, but the disc reproduces data optically by using a laser. Combinations of the foregoing items should also be included within the scope of the computer-readable medium.

An instruction may be executed by one or more processors such as one or more digital signal processors (DSP), a general purpose microprocessor, an application-specific integrated circuit (ASIC), a field programmable gate array (FPGA), or another equivalent integrated circuit or discrete logic circuit. Therefore, the term "processor" used in this specification may refer to the foregoing structure, or any other structure that may be applied to an implementation of the technologies described in this specification. In addition, in some aspects, the technology may be fully implemented in one or more circuits or logic elements.

The technologies in this application may be implemented in various apparatuses or devices, including a vehicle-mounted device, an integrated circuit (IC), or a set of ICs (for example, a chip set). Various components and modules are described in this application to emphasize functions of the apparatus configured to perform the disclosed technologies, but are not necessarily implemented by different hardware. Actually, as described above, various modules may be combined in hardware in combination with proper software and/or firmware, or may be provided by interoperable hardware (including one or more processors described above).

In the foregoing embodiments, the description of each embodiment has respective focuses. For a part that is not described in detail in an embodiment, refer to related descriptions in other embodiments.

The foregoing descriptions are merely specific implementations of this application, and variations or substitutions readily figured out by a person skilled in the art within the scope disclosed in this application shall fall within the protection scope of this application. The protection scope of this application shall be subject to the protection scope of the claims.

What is claimed is:

1. An apparatus for controlling a vehicle, comprising at least one processor and at least one memory coupled to the at least one processor, wherein the at least one memory stores program instructions, which when executed by the at least one processor cause the apparatus to:
    establish a first communication connection to a mobile terminal;
    predict a first movement track of the mobile terminal, the first movement track indicating a movement process in which the mobile terminal approaches the vehicle;
    perform a first operation, in response to the first movement track entering a first region, and the mobile terminal entering a second region;
    predict a second movement track of the mobile terminal, the second movement track indicating a movement process in which the mobile terminal leaves the vehicle; and
    perform a second operation, in response to the second movement track leaving a third region, and the mobile terminal leaving the second region;
    wherein the second region comprises the first region, and the third region comprises the first region.

2. The apparatus according to claim 1, wherein when executed by the at least one processor, the program instructions further cause the apparatus to:
    obtain a plurality of location parameters of the mobile terminal, wherein the first movement track is predicted based on the plurality of location parameters.

3. The apparatus according to claim 2, wherein
    the plurality of location parameters is obtained by the first communication connection, when a distance between the mobile terminal and the apparatus is less than or equal to a first preset value.

4. The apparatus according to claim 1, wherein when executed by the at least one processor the program instructions further cause the apparatus to:
    obtain a plurality of location parameters by the first communication connection, when a distance between the mobile terminal and the apparatus is greater than or equal to a third preset value, wherein
    the second movement track is predicted based on the plurality of location parameters.

5. The apparatus according to claim 1, wherein when executed by the at least one processor the program instructions further cause the apparatus to:
    establish a second communication connection to the mobile terminal; and
    perform a validity authentication on the apparatus and the mobile terminal by the second communication connection.

6. The apparatus according to claim 5, wherein the second communication connection comprises one or more of Bluetooth communication, ZigBee communication, or Wi-Fi communication.

7. The apparatus according to claim 1, wherein the first operation comprises one or more of unlocking a vehicle door, starting an engine, unlocking a trunk, powering on an entire vehicle, or starting an air conditioner.

8. The apparatus according to claim 1, wherein the second operation comprises one or more of turning off an engine, powering off the vehicle, locking a vehicle door, or turning off an air conditioner.

9. The apparatus according to claim 1, wherein the first communication connection comprises one or more of ultra-wideband (UWB) communication, Bluetooth communication, or Wi-Fi communication.

10. The apparatus according to claim 1, wherein one or more of a light, a sound, or notification information sent to the mobile terminal are used to notify that the first operation is performed, is being performed, or is to be performed.

11. The apparatus according to claim 1, wherein one or more of a light, a sound, or notification information sent to the mobile terminal are used to notify that the second operation is performed, is being performed, or is to be performed.

12. A vehicle control apparatus, comprising at least one processor and at least one memory coupled to the at least one processor, wherein the at least one memory stores program instructions, which when executed by the at least one processor cause the vehicle control apparatus to:
   establish a first communication connection to a vehicle-mounted apparatus; and
   send a plurality of pieces of first information to the vehicle-mounted apparatus, wherein the plurality of pieces of first information are used to indicate a location parameter of the vehicle control apparatus, and wherein a first movement track of the vehicle control apparatus is predicted based on the location parameter, the first movement track indicating a movement process in which a mobile terminal approaches a vehicle, a second movement track of the mobile terminal is predicted, the second movement track indicating a movement process in which the mobile terminal leaves the vehicle; and wherein a second operation is performed, in response to the second movement track leaving a third region, and the mobile terminal leaving a second region.

13. The vehicle control apparatus according to claim 12, wherein when executed by the at least one processor, the program instructions further cause the vehicle control apparatus to:
   establish a second communication connection to the vehicle-mounted apparatus; and
   perform a validity authentication on the vehicle-mounted apparatus and the vehicle control apparatus by using the second communication connection.

14. The vehicle control apparatus according to claim 12, wherein the first communication connection comprises one or more of ultra-wideband (UWB) communication, Bluetooth communication, or Wi-Fi communication.

15. The vehicle control apparatus according to claim 13, wherein the second communication connection comprises one or more of Bluetooth communication, ZigBee communication, or Wi-Fi communication.

16. The vehicle control apparatus according to claim 12, wherein when executed by the at least one processor, the program instructions further cause the vehicle control apparatus to:
   receive notification information notifying that an operation is performed, is being performed, or is to be performed on a vehicle where the vehicle control apparatus is located.

17. The vehicle control apparatus according to claim 16, wherein the operation comprises one or more of unlocking a vehicle door, starting an engine, unlocking a trunk, powering on an entire vehicle, starting an air conditioner, turning off the engine, powering off the entire vehicle, locking the vehicle door, or turning off the air conditioner.

18. A vehicle control method, applied to a vehicle-mounted apparatus, comprising:
   establishing a first communication connection to a mobile terminal;
   predicting a first movement track of the mobile terminal, the first movement track indicating a movement process in which the mobile terminal approaches a vehicle;
   performing a first operation, in response to the first movement track entering a first region, and the mobile terminal entering a second region;
   predict a second movement track of the mobile terminal, the second movement track indicating a movement process in which the mobile terminal leaves the vehicle; and
   perform a second operation, in response to the second movement track leaving a third region, and the mobile terminal leaving the second region;
   wherein the second region comprises the first region, and the third region comprises the first region.

* * * * *